US012413855B2

(12) United States Patent
Chen (10) Patent No.: US 12,413,855 B2
(45) Date of Patent: Sep. 9, 2025

(54) METHODS AND SYSTEMS FOR EXTRACTING OBJECTS FROM AN IMAGE

(71) Applicant: Adeia Imaging LLC, San Jose, CA (US)

(72) Inventor: Tao Chen, Palo Alto, CA (US)

(73) Assignee: Adeia Imaging LLC, San Jose, CA (US)

( * ) Notice: Subject to any disclaimer, the term of this patent is extended or adjusted under 35 U.S.C. 154(b) by 80 days.

(21) Appl. No.: 18/375,380

(22) Filed: Sep. 29, 2023

(65) Prior Publication Data

US 2025/0113102 A1 Apr. 3, 2025

(51) Int. Cl.
*H04N 23/67* (2023.01)
*G06T 7/11* (2017.01)
*H04N 23/62* (2023.01)

(52) U.S. Cl.
CPC ............ *H04N 23/67* (2023.01); *G06T 7/11* (2017.01); *H04N 23/62* (2023.01); *G06T 2200/24* (2013.01); *G06T 2207/20021* (2013.01); *G06T 2207/20081* (2013.01); *G06T 2207/20092* (2013.01)

(58) Field of Classification Search
CPC .......... H04N 23/67; H04N 23/62; G06T 7/11; G06T 2200/24; G06T 2207/20021; G06T 2207/20081; G06T 2207/20092

USPC ...................................................... 348/222.1
See application file for complete search history.

(56) References Cited

U.S. PATENT DOCUMENTS 9,542,626 B2 * 1/2017 Martinson ........... G06F 18/2431

OTHER PUBLICATIONS

Apple Support, "Lift a subject from the photo or video background on iPhone," (https://support.apple.com/guide/iphone/lift-a-subject-from-the-photo-background-iphfe4809658/ios), (1 page).

(Continued)

*Primary Examiner* — Joel W Fosselman
(74) *Attorney, Agent, or Firm* — HALEY GUILIANO LLP (57) ABSTRACT

Systems and methods are provided for object extraction from images influenced by depth of field settings. Through control circuitry, an image subjected to a prior segmentation operation is acquired. A subsequent segmentation operation is performed, modulating the depth of field setting to its extreme values, producing two distinct segmented images. From these, an in-focus object is derived, forming delineated representations. A similarity index between representations is computed. If this index exceeds a specified threshold, the in-focus object is extracted from the original image using the control circuitry.

20 Claims, 7 Drawing Sheets

(56) References Cited

OTHER PUBLICATIONS

Apple Support, "Use Portrait mode on your iPhone," (https://support.apple.com/en-us/HT208118),(3 pages).
Ben Schoon, "Samsung's One UI 5.1 can lift objects from a photo and cut out the background, just like iOS 16," (https://9to5google.com/2023/02/13/samsung-one-ui-5-1-object-photo-cutout/)(3 pages).
Chris Welch, "Google Photos for iOS adds portrait depth editing," (https://www.theverge.com/2018/11/19/18102899/google-photos-iphone-depth-editing-bokeh-color-pop-features),(3pages).
Kishan Vyas, "How to Enable and Use Portrait Mode on your Android or iPhone," (Dec. 30, 2022)(https://www.xda-developers.com/how-to-use-portrait-mode/)(8 pages).
Nicholas Sutrich, "How to lift objects from a photo on a Samsung Galaxy phone," (https://www.msn.com/en-gb/money/technology/how-to-lift-objects-from-a-photo-on-a-samsung-galaxy-phone/ar-AA17xfrJ),(3 pages).

\* cited by examiner

METHODS AND SYSTEMS FOR EXTRACTING OBJECTS FROM AN IMAGE

BACKGROUND

The present disclosure relates to methods and systems for improving the segmentation of objects from images, e.g., in smartphone photography. In particular, but not exclusively, the disclosure relates to methods and systems which consider both hardware and software implementations of an image taken using a portrait mode, as well as variations in depth of field settings, to refine the segmentation process.

SUMMARY

Portrait mode in contemporary smartphone photography, achieved through hardware, software, or a combination thereof, simulates depth of field by distinctly separating (e.g., segmenting) a foreground object from a blurred background. A subsequent development in image processing is the "lift-the-object" functionality, enabling users to segment or extract specific entities from their photographs. However, when extracting objects from images that utilize portrait mode's blurred background, challenges arise in ensuring segmentation precision and consistency.

The primary challenge can be attributed to the varied interpretations and implementations of the portrait mode feature across different devices, brands, operating systems, and individual applications. As a result, differences in device performance, algorithmic implementations, and application choices can lead to inconsistent segmentation outcomes.

In some approaches, implementing a depth of field setting to an image and lifting an object from that image presents complexities. While enhancing visual appeal, diverse depth of field settings can potentially confound a segmentation process. For instance, an image with pronounced background blur can obscure clear object boundaries, complicating the extraction process.

Given the varied implementations of portrait mode and the complications of different depths of field, there exists a need for an improved segmentation solution addressing inconsistencies across devices and systems, ensuring precise and consistent extraction of objects from images with blurred backgrounds, regardless of the originating platform or settings. Such enhancements can lead to improved efficiencies in processing segmented images, e.g., when analysis of a particular region of an image is desired.

Systems and methods are provided herein for efficient object extraction from images with depth of field settings. This is achieved by receiving, using control circuitry, an image having an associated depth of field setting due to a first segmentation operation applied to the image. A second segmentation operation is applied to the image using control circuitry to adjust the depth of field setting both to a maximum, generating a first segmented image, and to a minimum, producing a second segmented image. An in-focus object is extracted from each of the first and second segmented images, resulting in delineated images of the said in-focus object. A similarity index between these delineated images is then determined. When the determined similarity index surpasses a predefined value, e.g., a threshold or threshold value, the in-focus object corresponding to the delineated images is extracted from the initially received image using control circuitry. Alternatively or in addition, similarity indexes are determined between delineated images extracted from combinations of the initially received image, the first segmented image, the second segmented image, and/or other segmented images corresponding to different depth of field settings. When one or more of the determined similarity indexes surpass a predefined value, e.g., a threshold or threshold value, the in-focus object corresponding to the delineated image is extracted from the initially received image using control circuitry.

In some examples, in response to determining the similarity index is below a threshold, methods and systems advance the aforementioned approach by generating the delineated images from both the first and second segmented images for presentation at a user device. The system receives a feedback input, directing the selection of one delineated image over the other. This feedback input is utilized in training machine learning models, refining them based on these user-preferred segmented images.

In some examples, in response to determining that the similarity index is below the threshold, methods and systems further offer an interface, configured to allow adjustment of the depth of field setting to generate a third segmented image.

In some examples, the interface is designed to allow adjustment of the depth of field setting of the in-focus object, e.g., in real-time or near real-time, in response to a user input via the interface to generate the third segmented image having a depth of field setting between the maximum and the minimum depth of field settings.

In some examples, when determining the similarity index, methods and systems transform the delineated images from both segmented outputs into grayscale pixel maps and draw a comparative analysis between these grayscale transformations.

In some examples, methods and systems are inherently device aware. They would determine the capturing device of the original image, tap into a database to retrieve information relating to the capturing device, and then use this information to optimize the segmentation operation based on the retrieved information.

In some examples, methods and systems comprise applying the second segmentation operation to the image at multiple intermediate depth of field settings. Positioned between the maximum and minimum depth of field settings, this operation extracts in-focus objects from segmented images obtained from each of the intermediate depth of field settings. As a result, multiple further delineated images of the in-focus object are created, and the system determines an average similarity index between these multiple delineated images.

In some examples, methods and systems deploy adaptive methodologies. In instances where the similarity index falls below the threshold, these systems may initiate additional image enhancement techniques. The sequence of applying the second segmentation operation, extracting the in-focus object, and determining the similarity index is executed iteratively until a maximum or desired similarity index value is attained.

In some examples, methods and systems maintain detailed logs, recording the number of iterative processes executed. This mechanism ensures that iterations are terminated if they reach a maximum permissible limit.

In some examples, methods and systems are versatile in their segmentation scope. They would comprise applying the second segmentation operation iteratively across different regions of the received image. This approach identifies multiple distinct in-focus objects. The system then extracts each of these identified objects from both the first segmented image and the second segmented image, resulting in multiple sets of delineated images for each object. For every set of these delineated images, the system determines a similarity index. If this index for a set is above a threshold, the corresponding in-focus object is then extracted from the received image.

BRIEF DESCRIPTION OF DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
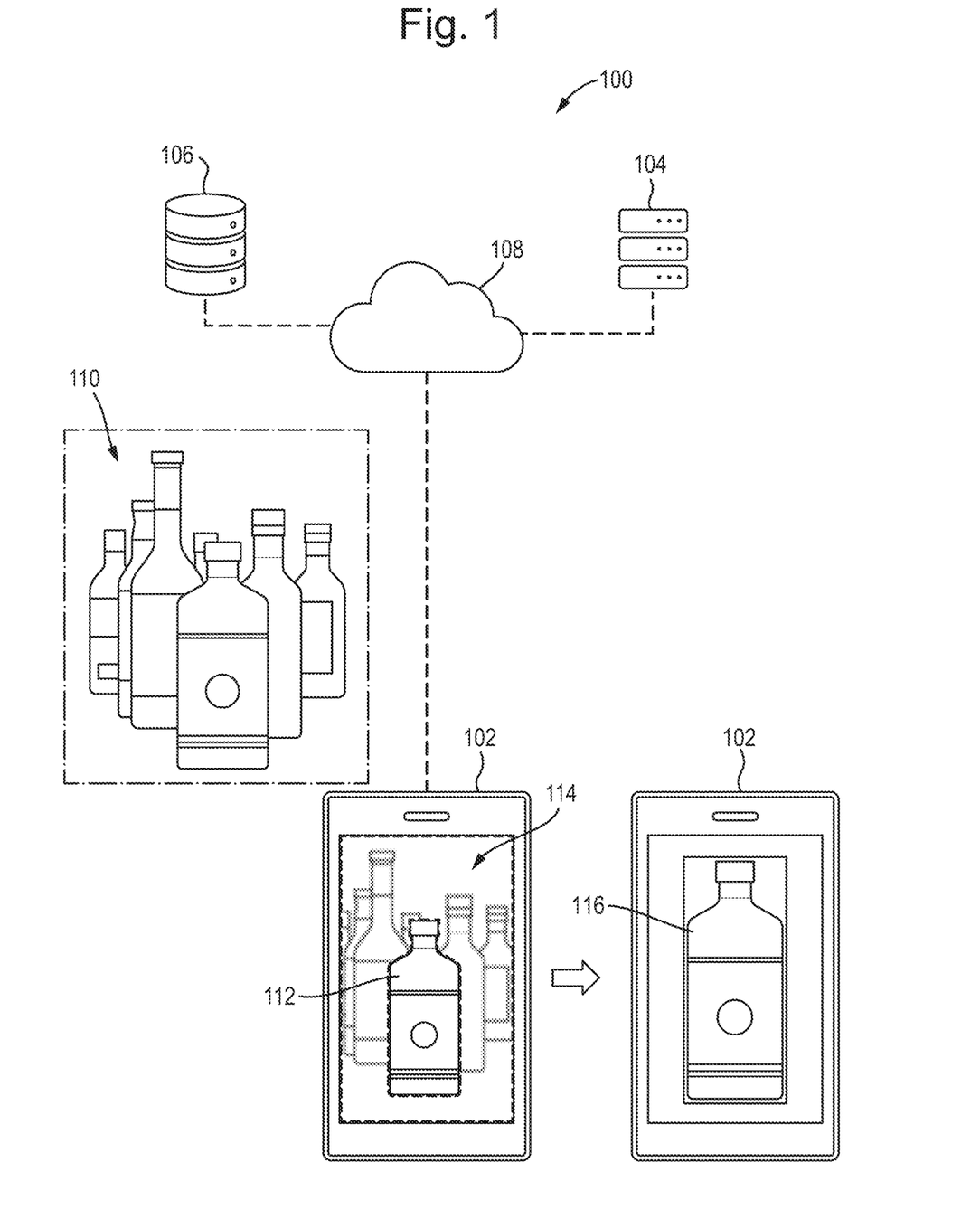
FIG. 1 illustrates an overview of the system for extracting objects from an image, in accordance with some examples of the disclosure.

FIG. 1 illustrates a system 100 for extracting an object from an image, e.g., an image captured using a "portrait mode" of an image capturing application. In the context of the present disclosure, the term "portrait mode" is a mode of an image capturing application that applies or generates a depth of field effect to an image. For example, an image may be captured using a user device, e.g., user device 102. In the example shown in FIG. 1, user device 102 is used to capture an image 110 of various objects, in this case, a selection of whiskey bottles. However, the content of the image may be any content appropriate for applying a depth of field effect, such as an image of an individual in front of a vista or an image captured for determination or diagnosis of a medical condition. In some examples, user device 102 may be configured to run an application for capturing images, either alone or in combination with server 104. For example, user device 102 may be in communication with server 104 and/or database 106 by virtue of network 108.

In the example shown in FIG. 1, user device 102 is a smartphone configured to capture an image using a portrait mode, or process a captured image to apply a depth of field effect to the captured image. For example, a depth of field effect may be applied to an image by virtue of an image segmentation operation applied to the captured image. By dividing the image into segments, the image may be processed to apply a depth of field effect to the image. In the context of the present disclosure, an image segmentation operation may involve converting a captured image into a collection of regions of pixels that are represented by a mask or a labeled image, e.g., using one or more image processing techniques, such as thresholding, clustering, edge detection, watershed transformation, etc. However, image segmentation may be performed using any appropriate computer vision and/or machine learning technique. In the example shown in FIG. 1, image 110 is segmented into a first segment 112, comprising a bottle in the foreground of image 110, and a second segment 114, comprising multiple bottles in the background of image 110.

In certain scenarios, extracting a portion of a segmented image, e.g., an already segmented image, is beneficial. For example, segmenting an image may produce an image that is less complex, which can reduce operational requirements when analyzing or post-processing an object in an image. For example, an image of a bone may be segmented to show an outer surface of the bone, a surface between compact bone and spongy bone and a surface of the bone marrow. In this manner, analysis of various segments of the bone may be more efficient, from a computational operation standpoint. In a similar manner, extraction of an individual from an image having a depth of field effect may be beneficial when trying to identify the individual. However, current approaches of extracting (e.g., "lifting") an object from an already segmented image present challenges. For example, extraction of an object, e.g., a bottle in the foreground of image 110, may result in an incomplete image of the bottle, e.g., as a result of the extraction process not accurately determining or fully recognizing the boundary of the bottle.

In the example shown in FIG. 1, an accurate image 116 of the bottle in the foreground of image 100 is generated by applying a second segmentation operation to the image 110, the second segmentation operation comprising adjusting a depth of field setting of image 110 to a first setting (e.g., a maximum setting) to generate another segmented image, and adjusting the depth of field setting to a second setting (e.g., minimum setting) to generate a further segmented image. The multiple segmented images can be analyzed to determine an accurate boundary for the object to be extracted from image 110. Such a process is described in more detail below in relation to FIGS. 3-7.

Figure 2:
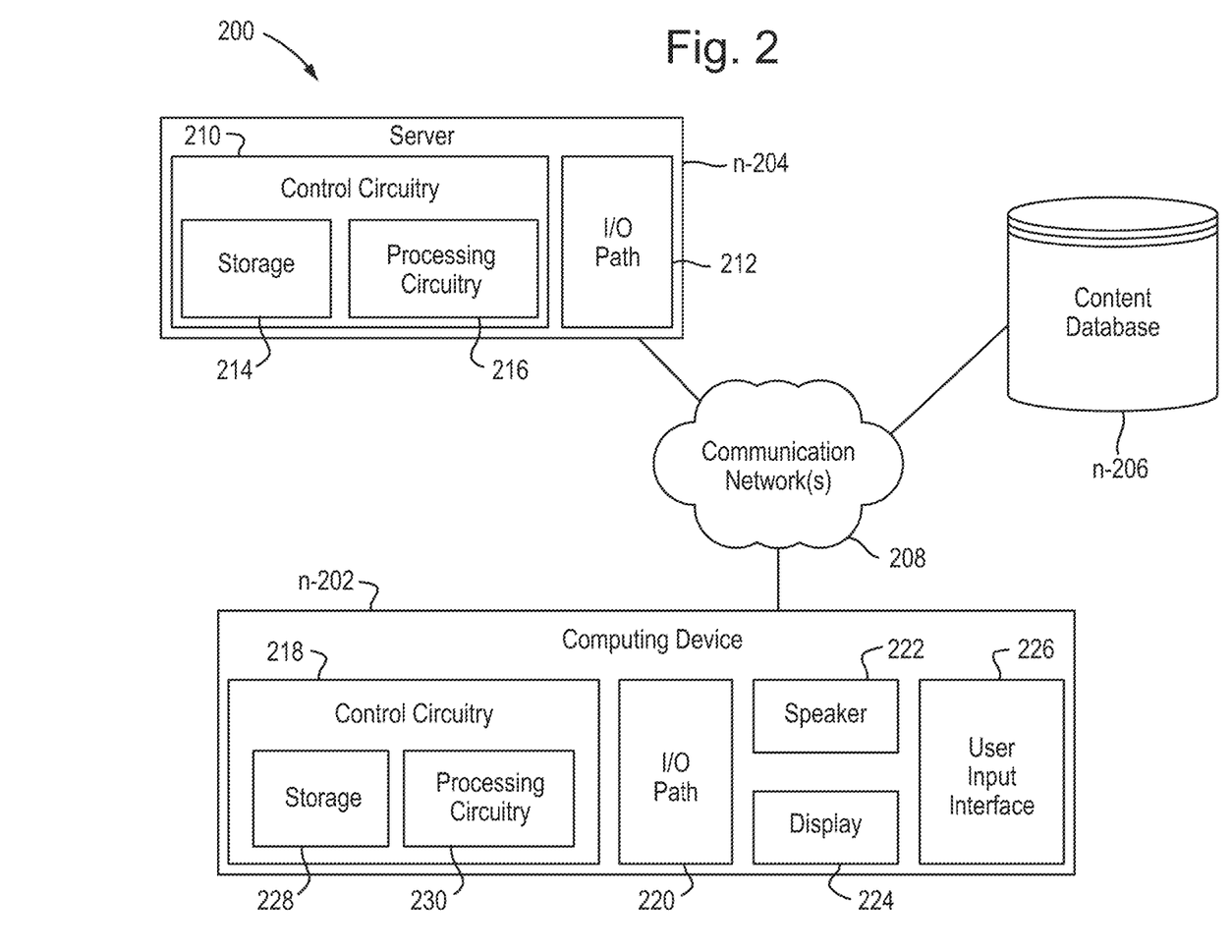
FIG. 2 depicts a block diagram showing components of an example system for extracting objects from an image, in accordance with some examples of the disclosure.

FIG. 2 is an illustrative block diagram showcasing the example system 200 designed for image segmentation and in-focus object extraction. Although FIG. 2 displays system 200 with a particular configuration and count of components, in some examples, any number of components of system 200 can be unified or integrated as one device, for instance, as user device 102. System 200 encompasses computing device n-202, server n-204 (analogous to server 106 and/or server 108), and image database n-206, each being communicatively connected to communication network 208, which could be the Internet, a local network, or any other suitable system. In certain examples, system 200 may not include server n-204, wherein functionality typically realized by server n-204 is instead taken up by other components of system 200, such as computing device n-202.

Server n-204 is composed of control circuitry 210 and I/O path 212. Notably, control circuitry 210 integrates storage 214 and processing circuitry 216. Computing device n-202, which could be a PC, laptop, tablet, or any other computing gadget, houses control circuitry 218, I/O path 220, display 224, and user input interface 226, which in specific examples provides selectable options related to image segmentation settings or focus object extraction. Control circuitry 218 integrates storage 228 and processing circuitry 220. Control circuitries 210 and/or 218 can be centered on a variety of suitable processing platforms, such as processing circuitry 216 and/or 220.

The storages, including 214, 228, and perhaps other storage elements within system 200, can be defined as electronic storage devices. These devices, be they RAM, ROM, SSDs, optical drives, cloud solutions, or others, may store image data, segmentation algorithms, metadata, or other pertinent information. Such storage devices may also incorporate non-volatile memory solutions. In specific cases, the application responsible for image segmentation and object extraction is stored in storages like 214 and/or 228, and is executed by control circuitry 210 and/or 218.

The application's architectural design could take various forms. It may be wholly housed on computing device n-202, with instructions retrieved from storage 228. Alternatively, in a client/server framework, a client-side application may reside on computing device n-202, with its server-side counterpart on server n-204.

In client/server models, computing device n-202 may employ a software tool, like a browser, to communicate with remote servers like server n-204. For example, server n-204 may store the segmentation instructions, process them via control circuitry 210, and then return the segmented images. Thus, the instructions' processing may be done remotely (e.g., by server n-204) while the results are visualized on computing device n-202.

Users can employ user input interface 226 to dispatch instructions to control circuitry 210 or 218. This interface, which could be a touchscreen, keyboard, or voice-controlled system, allows users to instruct segmentation, adjust extraction settings, or select focused objects.

Both server n-204 and computing device n-202 communicate, sending and receiving image data and instructions via I/O paths, 212 and 220, respectively. For example, these paths may include communication ports to exchange segmentation settings, image data, extraction results, and other related data via communication network 208.

Figure 3:
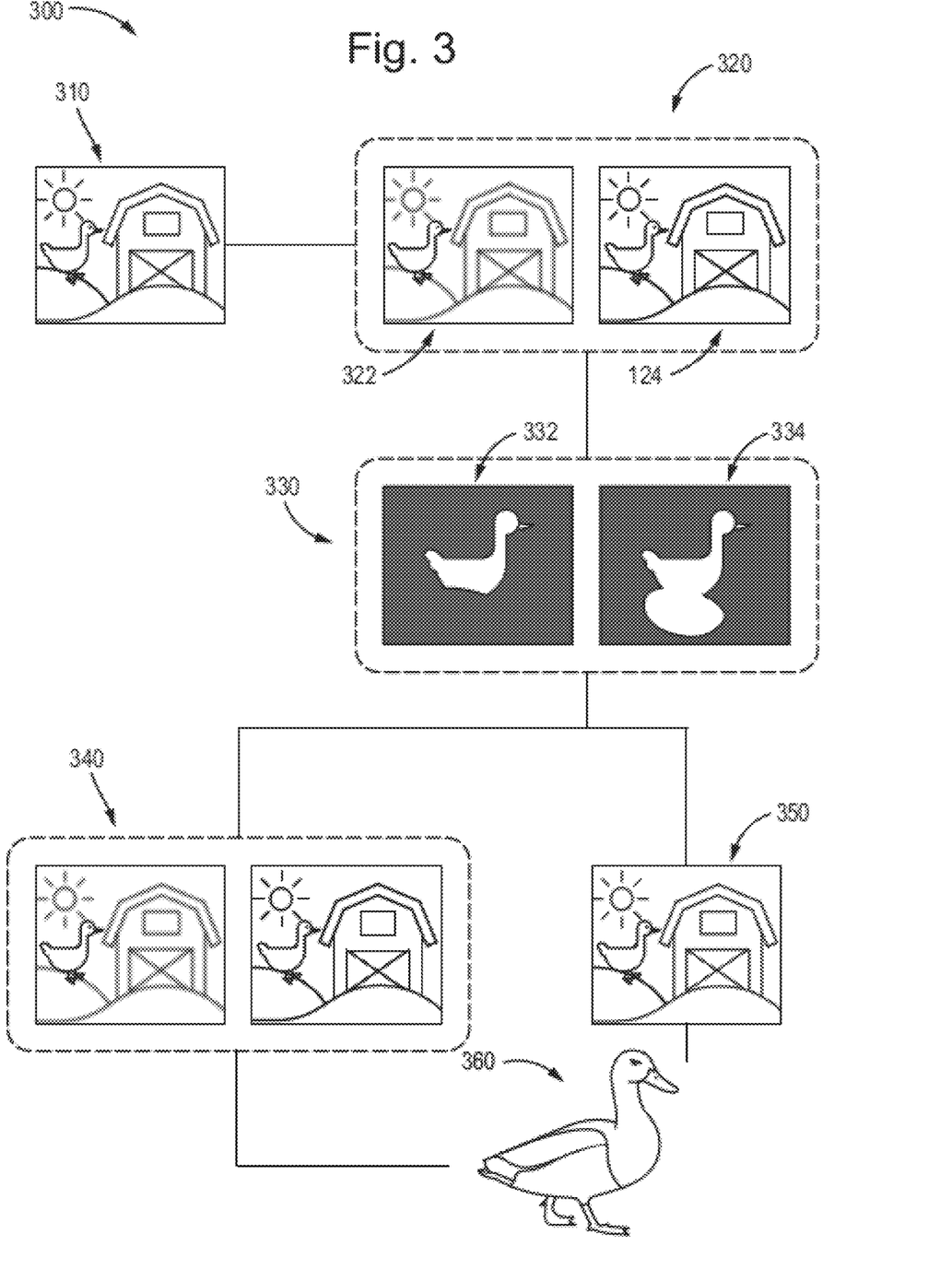
FIG. 3 illustrates a representative process for extracting in-focus objects from segmented images, in accordance with some examples of the disclosure.

FIG. 3 illustrates a representative process 300 for extracting in-focus objects from segmented images, wherein segmented images pertain to those having a simulated depth of field setting that distinguishes a foreground object from its blurred background. In the example shown in FIG. 3, the received image 310 is illustrative of a 'portrait mode' photo, a feature commonly associated with modern mobile devices. Such photos emphasize an object in sharp focus while blurring the background, enhancing the object's prominence. The segmented images are characterized by a simulated depth of field setting that distinguishes a foreground object from its blurred backdrop. Image segmentation involves converting an image into a collection of regions of pixels that are represented by a mask or a labeled image. By dividing an image into segments, you can process only the important segments of the image instead of processing the entire image.

In some examples, once the image is received or accessed by the system, an initial step involves determining the capturing device of the said image. Different devices may have distinct imaging hardware and software capabilities. These variances may impact the nuances of the captured images, ranging from color profiles, sharpness, saturation, to depth perception.

In some examples, device-specific information may be access from a database which contains a repository of information pertaining to various capturing devices. The retrieved information may include, but may not be limited to, sensor specifications, lens attributes, inherent post-processing algorithms, resolution capacities, and other imaging-related details. The system may refine the segmentation operation based on the capturing device's attributes.

The received image 310, which in this example depicts a scene containing a duck poised on a hill with a farmhouse in the background has undergone a first segmentation operation. In some embodiments, the segmentation operation may comprise various techniques and algorithms tailored to the specific needs of the image. These may range from techniques prioritizing edge detection, color contrasts, and texture differentiation to more sophisticated methods leveraging deep learning models. In the example shown in process 300, the received image has been taken on a device using 'portrait mode', which emphasizes the subject in the foreground by applying a blur effect to the background, simulating a shallow depth of field typical of DSLR cameras. Additionally, other modes may focus on emphasizing specific colors, enhancing shadows, or even identifying and highlighting specific predefined subjects. In some embodiments, the techniques disclosed here are applicable to a variety of scenes and subjects, ranging from people and animals to inanimate objects, landscapes, cityscapes, and other diverse scenarios.

Subsequent to the initial reception, at process 320, a second segmentation process is employed. In this example, this second operation involves adjusting the depth of field setting to its minimum, as shown at 322, and to its maximum, depicted at 124. The outcome 334 the adjustment at 322 results in an image where the background is significantly blurred or de-focused. Conversely, the image at 124 displays everything in sharp clarity, devoid of any background blur.

Progressing to process 330, the in-focus object, in this instance, the duck, is extracted from both segmented images. Observationally, the object or delineation at 332, sourced from image 322, presents the duck with a segment missing, specifically the duck's feet. This omission may be attributed to the minimum depth of field setting, which, in some examples, blurs the demarcation between the duck and its immediate surrounding, leading to extraction inaccuracies. Conversely, the delineated object at 334, sourced from image 124, reveals the duck with extraneous inclusions, like a segment of the ground. The maximum depth of field setting, in this example, might lead to over-extraction, encompassing elements beyond the intended object.

It may be inferred that for an 'ideal' or 'perfect' image where any in-focus object extraction yields minimal error, the segmented images at 332 and 334 would consistently exhibit minimal deviations, regardless of depth of field adjustments. The alterations would be confined largely to background elements like focus and blur. In other words, a received image subjected to an optimal segmentation operation would make sufficiently clear the demarcation between the intended in-focus object and the background. The resulting object extraction will only include said object, without additional background artifacts or the loss of parts of the object. However, for 'imperfect images' or those where the focal object may be partially out of focus, the segmentation, particularly when modulating depth of field, may inadvertently adjust parts of the focal object with the background, thus, resulting in an object extraction process which may be prone to more errors. The aforementioned scenarios represent just a selection of the various challenges faced during the object extraction process from images. Such challenges may result in the unintended inclusion of extraneous artifacts or the inadvertent exclusion of portions of the intended object.

To address potential discrepancies and ascertain the presence of errors in the extracted objects, the process proceeds by contrasting the delineated images and comparing them to each other. This comparative analysis, shown in more detail at FIG. 5, generates a similarity index, quantifying the likeness between the resulting images. By leveraging this index, potential deviations, or anomalies in the object extraction phase may be pinpointed.

In some embodiments, a higher index, indicative of minimal disparities, suggests that the object extraction process remains resilient to errors and affirms the efficacy of the original segmentation operation, e.g., an image taken with a portrait mode setting applied. When confronted with a high similarity index, in certain examples, the system may opt to use the original image 350 as a base for object extraction, or alternately, the image with the maximum depth of field setting. This choice stems from the understanding that, despite potential minor extraction discrepancies in the minimum depth of field image, the resultant image might seem less crisp due to the settings applied for blurring, as shown in more detail at FIG. 4. However, in scenarios where the similarity index is below a threshold, the process may progress to display to an end-user, both segmented images with minimum and maximum depth of field applied at 340. This may allow the user to adjudicate on the preferred image for extraction. In either case, the end result is a segmented object of the object of focus 360, namely the duck as mentioned above.

Figure 4:
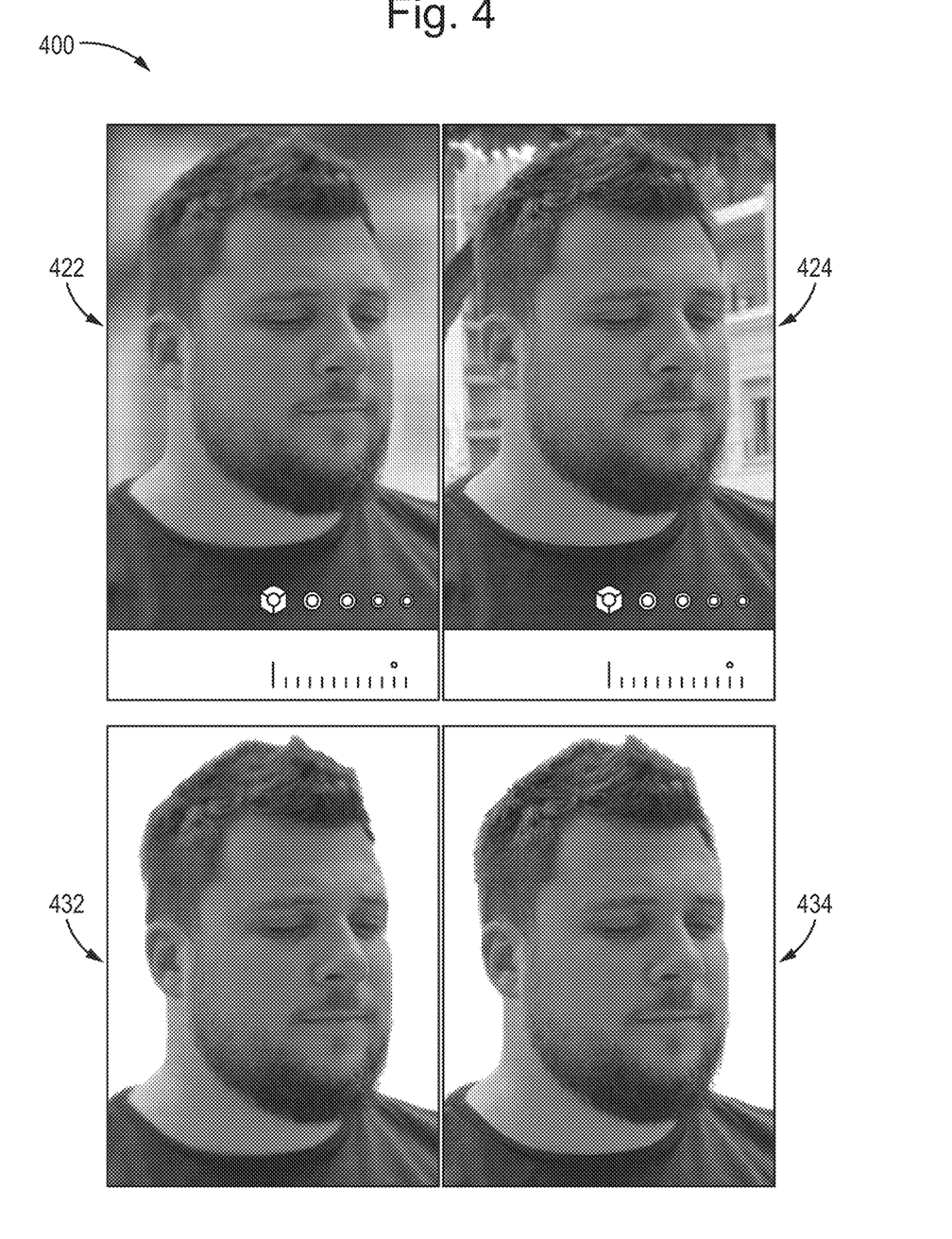
FIG. 4 presents the application of the second segmentation process, in accordance with some examples of the disclosure.

FIG. 4 presents process 400, which centers on the application of the second segmentation process to two distinct images differentiated by their depth of field settings. Specifically, the figure delineates the transformative steps of the original image under both minimum and maximum depth of field settings, and their subsequent segmentations.

In the depicted embodiment, the minimum depth of field image 422, offers a depiction of a man's facial close-up, where the backdrop reveals a tree and some architectural structures or buildings. Due to the nature of the minimum depth of field setting, the background elements, such as the tree and the buildings, appear in a blurred or defocused manner. This intentional blur serves to emphasize the primary subject, which in this instance is the man's face.

Conversely, the maximum depth of field image 424 portrays the same scene but with a striking difference in the sharpness and clarity across the entirety of the image, encompassing both the man's face and the background elements.

Following the second segmentation process, delineated objects 432 and 434 are extracted from images 422 and 424, respectively. The delineated object 432, which arises from the minimum depth of field image, retains some degree of blur. However, this does not detract from the accuracy of the segmentation, as evidenced by the lack of apparent artifacts, or missing portions of the man's face. The delineated object 434, derived from the maximum depth of field image, showcases the facial features in pronounced detail and sharpness.

Upon observation, neither delineated objects 432 nor 434 exhibit conspicuous inclusion or exclusion errors. This signifies a robust and accurate segmentation in this particular instance. Nonetheless, as one might discern, the image quality difference between the two delineated objects is clear, with object 432 inheriting the blurriness of its source image 422, while object 434 reflects the crispness of image 424. In some embodiments, users may find the detailed sharpness of object 434 more desirable, especially when the objective is to focus on intricate details of the subject.

In some examples, prior to undergoing the second segmentation operation, the image may be subjected to a series of manipulations or enhancements. These enhancements, aimed at refining the image's quality and aiding in a more precise object extraction process, may be instigated either manually, based on user discretion, or automatically by the system.

The system's decision to enhance an image may be contingent upon an array of factors, encompassing aspects like the initial image quality, noise, contrast levels, and other intrinsic attributes of the image. These adjustments may include but are not limited to adjustments to its brightness, ensuring that details within shadowed or overly illuminated areas are discernible; modifications to the contrast, to better differentiate between the object and its background; tweaks to the saturation, enhancing or muting specific color intensities to achieve a more balanced representation; and fine-tuning the sharpness, ensuring the object in focus is clear while maintaining the image's overall integrity.

Following the image enhancement, the method may be configured to re-initiate certain operations, specifically: re-application of the second segmentation procedure, subsequent extraction of the in-focus object, and the ensuing determination of the similarity index. This cycle, encompassing image enhancement and the described operations, may be set to repeat iteratively. The iterations may be carried out until the number of iterations reaches a limit set by the system or when the derived similarity index approaches its maximum potential value, thereby suggesting that the most accurate version of the in-focus object is extracted.

In some examples, the second segmentation operation may be applied at various intermediate depth of field settings between the aforementioned maximum and minimum. The precise number, as well as the range of these intermediate settings, may be predetermined or dynamically set based on specific requirements or the characteristics of the image in question.

Following the application of the second segmentation operation across these intermediate depth of field settings, in-focus objects may be extracted from each of the segmented images resulting from these settings. This results in the generation of multiple delineated images of the in-focus object, each representing the object as captured at a specific depth of field setting. As one might expect, the distinct delineated images can vary in clarity, detail, and other visual attributes based on the depth of field setting used during the segmentation.

Having obtained these multiple delineated images an average similarity index may be determined between these multiple images. The method used to calculate this similarity index can be based on various metrics or algorithms, which could include pixel-by-pixel comparison, feature extraction techniques, or other image analysis methods. One objective of determining this average similarity index may be to provide a singular metric or value that represents the overall similarity between all the delineated images generated across the different depth of field settings. This average similarity index may then be used for various purposes, including but not limited to, assessing the quality of the segmentation operation, optimizing further image processing steps, or informing decisions related to image presentation or storage.

In some examples, the second segmentation operation is performed iteratively across varied regions of the image, aiming to identify multiple, distinct in-focus objects within the image. Each distinct object may be separately extracted from both the first and second segmented images. As a result, multiple sets of delineated images, each corresponding to an individual in-focus object, are generated.

For every distinct set of delineated images, a unique similarity index may be determined, reflecting the congruence between those images. If, for any given set, the similarity index surpasses a specific threshold, the associated in-focus object may be extracted from the original received image.

Figure 5:
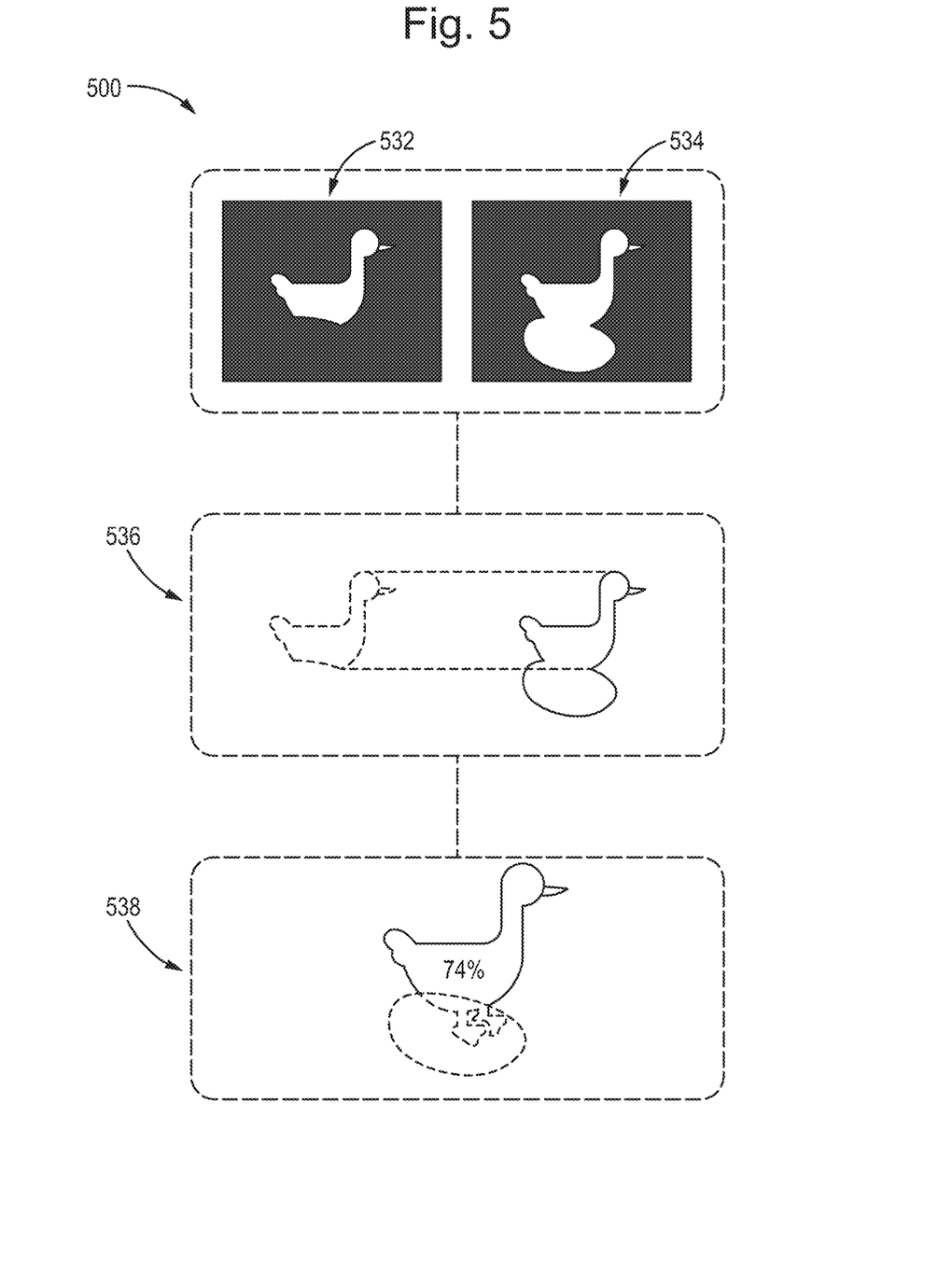
FIG. 5 illustrates a process for determining a similarity index, in accordance with some examples of the disclosure.

FIG. 5 illustrates process 500, for determining a similarity index by comparing objects extracted from images subjected to varying depth of field settings.

Both images 532 and 534 showcase an extracted object, specifically a duck but with noticeable distinctions, stemming from the differences in depth of field settings applied during the segmentation process. For example, extracted image 532 seems to have overlooked the legs of the duck, which is a clear omission. On the other hand, image 534 appears to have incorporated an extraneous segment, specifically capturing an unintended section of the ground from the original backdrop.

To ensure accurate and clear comparisons, the extracted images have undergone a transformation into grayscale pixel maps. Grayscale conversion, a technique rooted in simplifying visual data, aids in accentuating boundaries and edges, reducing the complexities often associated with color data. With the background noise minimized, the edges, like those delineating the duck and its surroundings become more discernible.

In some examples, other techniques may also be employed to achieve a similar objective. For instance, binary thresholding may be applied, where each pixel is translated into just two values, black and white, further amplifying the contrast between the object and its background.

In some examples edge detection algorithms, such as the Sobel, Canny, or Prewitt operators, may be integrated to identify abrupt intensity changes, pinpointing the peripheries of the object of interest.

In some examples, techniques such as histogram equalization may be considered as a further step in enhancing the contrast of images, especially if the original images lack contrast or are overly dominated by specific brightness values.

Furthermore, in scenarios where color plays a pivotal role in defining boundaries, color channel separation or the use of specific color spaces, like HSV or Lab, may be implemented by focusing on certain color dimensions. Similarly, frequency-based methods, like Fourier transforms, may be used to isolate features based on their frequency components.

Collectively, these techniques, whether applied singularly or in combination, aim to improve the boundary outlining the extracted object, thereby bolstering the reliability and accuracy of the subsequent comparison and analysis steps.

With the images in grayscale, at 536 a comparison between the two takes place. This may be achieved through various techniques. For example, image 532 may be overlayed onto image 534 or vice versa. This overlay may allow for an empirical assessment of similarity and identifies discrepancies between the two delineations such as unintended inclusions or omissions as discussed previously. To compare the similarity between the representations, 532 and 534, the calculation of Normalized Probabilistic Rand (NPR) index can be deployed. Alternatively, the calculation of Dice Similarity Coefficient (DSC) can be used. In those calculations, one of 532 and 534 serves as the reference and the other is the target for the comparison. A combination, or normalized weighted average, of the NPR index and DSC can be used for the comparison.

In some examples, the outcome of this comparative operation may be quantified in percentage terms, as depicted in 538. Here, a similarity value of 74% emerges, a metric indicating the degree of similarity between the two images.

In some examples, the comparison between the two extracted images may offer an insightful visual representation. By merging the overlaid images, the system may project a composite view that hints at what an optimal extraction may resemble.

In this example, the threshold similarity value pertaining to an acceptable extraction may be set at 75%. However, as can be seen at 538 the attained similarity value of 74% falls marginally short, signaling a sub-optimal object extraction.

In some examples, following the segmentation operation at both the minimum and maximum depth of field settings, the method may involve applying the second segmentation operation on the image at multiple intermediate depth of field settings. These intermediate settings fall between the two extremes, namely the minimum and maximum depth of field settings. Such an approach is designed to offer a spectrum of segmented images, each varying in how it emphasizes the foreground object relative to the background.

Subsequent to these segmentations, the in-focus objects may be extracted from each of these segmented images. This process results in an array of delineated images, each representing the in-focus object as discerned from a unique depth of field setting.

In some examples, an average similarity index between these multiple delineated images may be calculated. The rationale behind determining this index could be to gauge the consistency in the depiction of the in-focus object across these varied depth of field settings.

Further, the system may compare this average similarity index against a predetermined threshold. Should the average similarity index surpass this threshold, it may indicate that the delineated images are largely consistent, potentially signifying a successful and accurate extraction process. This process may, as is evident in the example shown at 538, remedy a similarity index which would otherwise fall slightly shy of the threshold. Conversely, if the average index is found to be below this threshold, it could hint at variations across the delineated images, pointing towards possible inconsistencies in extraction.

In another example, the system may be designed to select the iteration that showcases the highest similarity index. Such a selection suggests that the delineated image from this particular depth of field setting is the closest representation of the in-focus object, resonating well with the majority of the other delineations.

Moreover, by scrutinizing the variance in similarity indices between consecutive iterations, the system may identify specific depth of field settings where there is a pronounced and sudden change in the similarity index. These points may be the depth of field settings where delineation accuracy varies considerably. Recognizing these junctures helps to provide valuable insights into the optimal range of depth of field settings that render the most consistent and reliable extractions.

In some examples, when a threshold similarity index cannot be obtained, the system may defer to human judgment, presenting both delineated images to a user. Such manual intervention allows for a secondary layer of verification, ensuring that the final chosen image truly represents the intended object of focus with the utmost accuracy.

In some examples, the system is configured with a capability to utilize or be provided with a reference image or to autonomously identify the depicted object and subsequently search a database for reference images corresponding to that object. For instance, upon recognizing the object as a "duck", the system may retrieve reference images of a duck to ascertain a more holistic representation. By leveraging these reference images, which may exhibit commonalities such as color, background and the like, the system may discern potential discrepancies in the extracted image and undertake appropriate adjustments either during the extraction step or to the depth of field settings applied before or after it to achieve an extraction more in line with the standard or expected depiction of the object. To illustrate such an example, at 538, the system makes an assumption as to what a correct segmentation process should arrive at, specifically including the duck's legs and feet.

In some examples, the system may not possess a contextual understanding of the object's typical appearance, for example, a "duck". The system may rely on the similarity index derived from comparing the two delineated images. Consequently, the system's judgments and subsequent operations are fundamentally based on this quantitative similarity assessment rather than a qualitative evaluation of the object's true-to-life representation. In such an example, the system may opt to employ a human-assisted verification process as a means of determining if the extracted object displays any unintended errors.

Figure 6:
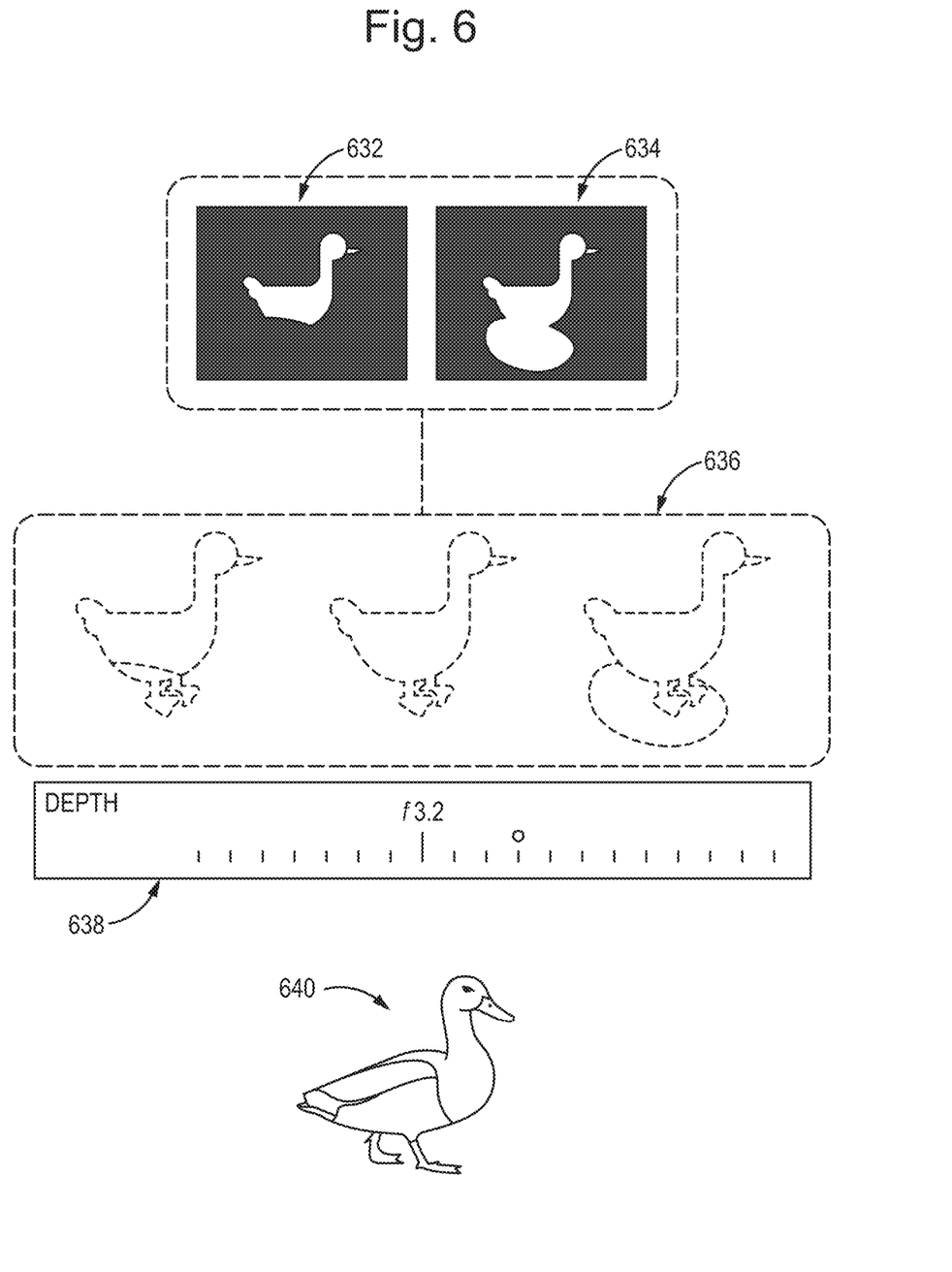
FIG. 6 depicts a process for presenting the delineated images from the first and second segmented images to a user, in accordance with some examples of the disclosure.

FIG. 6 illustrates process 600 for presenting the delineated images from the first and second segmented images to a user. In an example where a determined similarity index between the two images falls below a required threshold, the system may employ a human-assisted verification process as a means of determining if the extracted object displays any unintended errors.

Process 600 presents two delineated images, 632 and 634, each representing an object, which in this example is a duck as previously described in FIG. 5. These images emerge from distinctive depth of field settings. Image 632, set at a minimum depth of field, displays unintended exclusions while image 634 set at a maximum depth of field displays unintended inclusions.

While the process of comparing the two delineated images determines the variance between the aforementioned images, the system may not innately recognize the qualitative nuances of these variations. For example, whether these discrepancies originate from inadvertent inclusions or unintended omissions may be difficult to determine.

In light of this, the intervention of a human verifier becomes useful. The human verifier may play a role in evaluating the delineated objects. Their task entails an analysis to ascertain which image derived from either the maximum or minimum depth of field setting offers a more authentic representation of the original object.

To ensure that this evaluation process is streamlined and user-friendly, the system presents a user-interface. This interface may offer a side-by-side display of images 632 and 634, thus providing the human verifier with a comparative vantage point. The verifier may make an informed decision, opting to either select one of the images or to dismiss both if they deem neither adequately captures the original object's essence.

If the verifier decides to reject both images, the system may take action by reverting to utilizing the original image as the primary reference point for subsequent tasks, or default to the image obtained at the maximum depth of field setting, considering its inherent potential for a sharper overall image.

In some examples and interactive tool 638 may be presented to the user. This interface component, denoted as a slider bar 638, serves a dual purpose. At a basic level, it may provide a tangible representation of the depth of field continuum, ranging from minimum to maximum. It may also grant users an interactive medium to adjust the depth of field in real-time.

Upon manipulating the slider bar 638, the system may dynamically recalculate and render a visualization of the object as it would appear with the user-defined depth of field setting. This real-time feedback mechanism may offer the user a hands-on approach to refining their selections iteratively. The iterative adjustments, when paired with instantaneous visual feedback, may allow the verifier to identify and lock-in an optimal extraction setting that meets their precision criteria.

In some examples, the system may use the feedback received by a user as part of an adaptive mechanism facilitated by machine learning (ML) models. When a user interacts with the interface, selecting or rejecting delineated images, this feedback may be used as training data. For instance, when a user prefers one segmented image over another or adjusts the depth of field settings to obtain a desired segmentation, these actions may serve as implicit endorsements or critiques of the system's output. Over time, and with a growing repository of user interactions, the system's underlying ML model may be continually trained, refining its segmentation algorithms based on the accumulated user feedback.

Upon completion of this calibration, the system may internalize the user-endorsed setting. This setting, having undergone human verification, may then be treated as a benchmark parameter for subsequent operations within the system.

Figure 7:
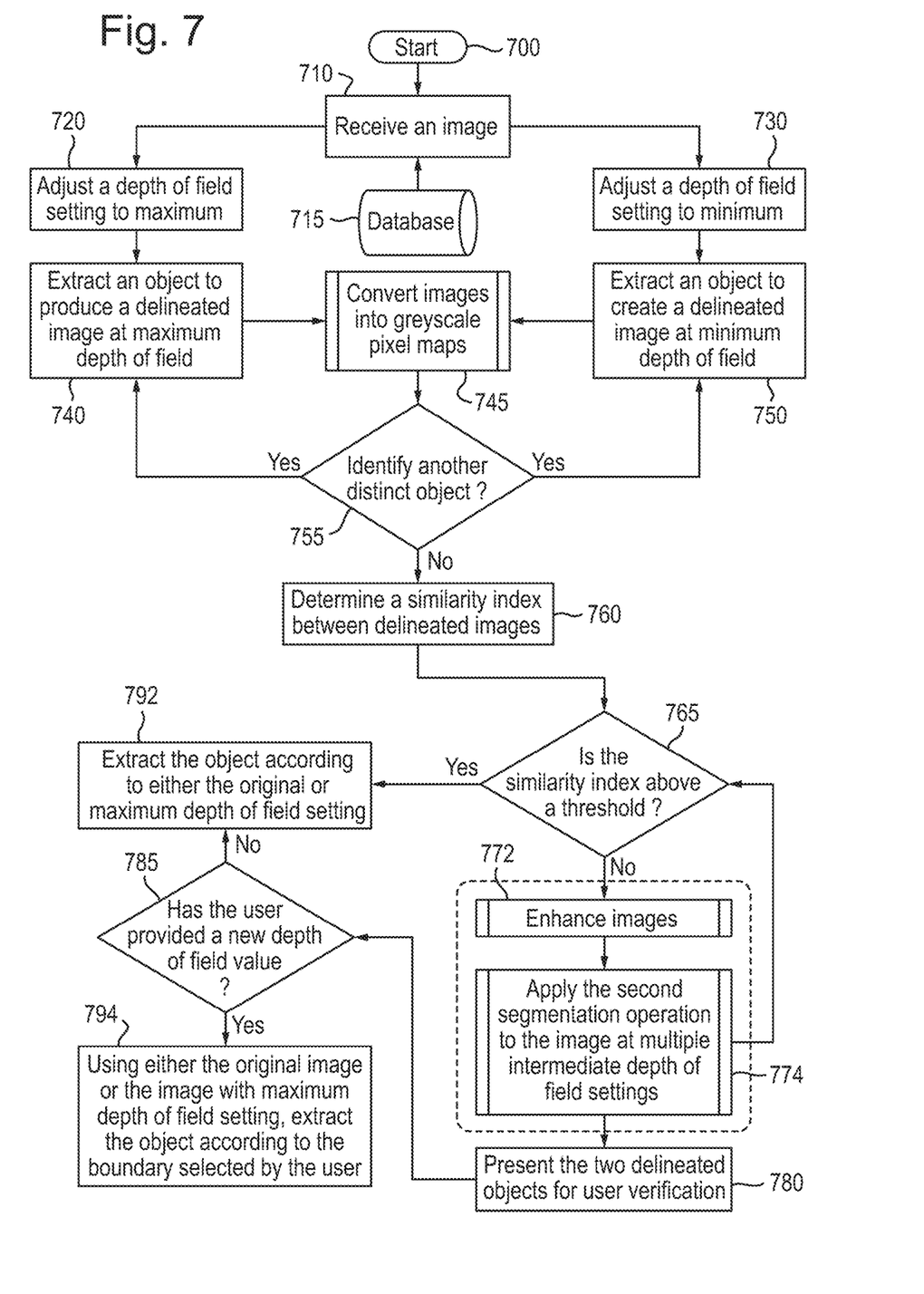
FIG. 7 shows a flowchart representing processes for extracting objects from a received image, in accordance with some examples of the disclosure.

Referring now to FIG. 7, there is shown a flowchart representing process 700, which illustrates a series of steps for extracting an object from a received image. At step 710, the system is configured to receive an image. As noted in prior discussions, this received image may optionally be subjected to an initial segmentation operation, such as that found in modes like 'portrait mode'.

In some embodiments, for systems equipped with AI capabilities, a user may have the provision to specify the intended object for extraction, for example, by providing input such as 'a duck situated on a hillside'. Such specific user input can guide the system's segmentation algorithm with a higher degree of accuracy.

At step 715, the system may engage a database. This database or databases house information which may include, but is not limited to, data pertaining to the device which played a role in capturing the received image.

Moving forward, at steps 720 and 730, the system is adapted to adjust the depth of field setting, spanning between the maximum and the minimum configurations. These settings underpin the subsequent object extraction steps, which are embodied in steps 740 and 750. Herein, the extraction process yields at least two delineated images from the respective depth of field settings. In an embodiment, an extraction process is or has been performed to extract the object from the "default" image received at step 710, which yields a delineated image from the depth of field setting of the default image. Data regarding the delineated image from the default image may also be received at step 710, retrieved from the database 715, or generated if not otherwise available.

These extracted images are then processed in step 745, where they are converted into greyscale pixel maps. This conversion facilitates further comparison and analysis by reducing color-based variabilities.

At step 755, the system determines if another object, distinct from the object already extracted is present in the processed image. A distinct object may be any object which is in the foreground of the segmented images which maintains some level of focus but represents, for example, a different person or object. Step 755 will iterate until no more distinct objects are found.

The ensuing operation at step 760 involves the determination of a similarity index between the delineated images. A similarity index may be determined between combinations of the delineated images corresponding to the default, maximum, minimum, or other depth of field settings. Various methodologies may be employed for this determination. For one embodiment, the images are converted into grayscale pixel maps, a technique that reduces the image data complexity by removing color variations, and places emphasis on edges and boundaries. It should be appreciated that the grayscale conversion is but one method among several other alternative examples.

In yet another example, the comparison result at step 760 may be quantified in percentage terms. For illustrative purposes, a similarity value of, say, 74% could be derived, indicating the degree of resemblance between the two images.

At step 765, the system evaluates the derived similarity index against a predetermined threshold. This threshold, as one would appreciate, can be set based on various criteria, depending on the use-case or the specificity of the application in question. For instance, a threshold of 80% may be deemed acceptable for some applications, while others may demand a more stringent 90%. When multiple similarity indexes are determined between different sets of images, the determination at step 765 may include tracking a count of similarity indexes above and below the threshold. In this case, the count of similarity indexes above and below the threshold may further be compared to a count threshold to trigger control transitioning to block 792 or 772.

Should the similarity index surpass this threshold; the system is predisposed to proceed with the extraction of the object according to either the original image or the image with the maximum depth of field setting applied at 792. This is informed by the understanding that images with a minimum depth of field setting may carry a higher propensity for being out of focus, thus reducing the overall fidelity of the extracted object. Should the similarity index fall short of the threshold, the process proceeds to step 772. At step 772 the system may enhance the delineated images and/or reapply the second segmentation operation at 774, at varying intermediate depth of field settings, aiming to elevate the similarity index above the threshold. After iterating to a defined stop, if the similarity index is still found lacking against the threshold, at step 780 the system facilitates presenting the two delineated images to a user for verification. In this interactive mode, the user may be empowered with various tools to facilitate their judgment. One might envision a side-by-side juxtaposition of the images, with tools allowing zooming, panning, or even highlighting certain areas for closer scrutiny.

Based on user interaction, if a choice is rendered at step 785, the system considers the user's boundary selection from the delineated images. Even if the user selects the image with a minimum depth of field, the system, prioritizing clarity, would transpose the selected boundary onto either the original or the image with maximum depth of field settings. In other words, the boundary obtained from the user selected image would be used to extract an object from either the original image or the image with maximum depth of field at 792. This judicious approach ensures optimal sharpness while heeding the user's boundary preferences.

Conversely at 794 if the user intervenes and makes a selection between the maximum and minimum depth of field settings, the system adopts the user-defined boundary in step instead. However, it is important to consider that the system overlays the user selected boundary onto either the original or maximum depth of field image. This ensures accurate object extraction while maintaining image clarity.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. In the discussion of distinct maximum and minimum depth of field settings, for instance, the distinct settings may correspond to actual highest and lowest settings that are possible for a given device, or may correspond to relatively high and relatively low settings that are user-specified or preferred, for instance. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, using control circuitry, an image, the image having an associated depth of field setting due to a first segmentation operation applied to the image;
   applying, using control circuitry, a second segmentation operation to the image, the second segmentation operation comprising adjusting the depth of field setting to a maximum to generate a first segmented image, and adjusting the depth of field setting to a minimum to generate a second segmented image;
   extracting, using control circuitry, an in-focus object from each of the first segmented image and the second segmented image, resulting in delineated images of the in-focus object;
   determining, using control circuitry, a similarity index based on the delineated images; and in response to determining that the similarity index is above a threshold, extracting, using control circuitry, an in-focus object corresponding to the delineated images from the received image.

2. The method of claim 1, further comprising:
   in response to determining that the similarity index is below the threshold, generating the delineated images from the first and second segmented images for presentation at a user device;
   receiving a feedback input to select one of the delineated images from the first segmented image or the second segmented image; and
   utilizing the feedback input to train a machine learning model.

3. The method of claim 2, further comprising:
in response to determining that the similarity index is below the threshold, providing an interface to adjust a depth of field setting to generate a third segmented image.

4. The method of claim 3, further comprising;
adjusting the depth of field setting of the in-focus object in real-time in response to a user input via the interface to generate the third segmented image having a depth of field setting between the maximum and the minimum depth of field settings.

5. The method of claim 1, wherein determining the similarity index further comprises:
determining a first similarity index between the delineated image extracted from the first segmented image and a delineated image of the in-focus object extracted from the received image; and
determining a second similarity index between the delineated image extracted from the second segmented image and the delineated image of the in-focus object extracted from the received image.

6. The method of claim 1, wherein determining the similarity index comprises:
converting the delineated images from the first and second segmented images into corresponding grayscale pixel maps; and
comparing the grayscale pixel maps.

7. The method of claim 1, further comprising:
determining a capturing device of the image;
retrieving information relating to the capturing device from a database; and
optimizing the second segmentation operation based on the retrieved information.

8. The method of claim 1, further comprising:
applying the second segmentation operation to the image at multiple intermediate depth of field settings between the maximum depth of field setting and the minimum depth of field setting;
extracting in-focus objects from the segmented images obtained from each of the intermediate depth of field settings, resulting in multiple further delineated images of the in-focus object; and
determining an average similarity index based on the multiple delineated images.

9. The method of claim 1, further comprising:
a) in response to determining the similarity index is below the threshold, applying additional image enhancement techniques to the received image;
b) re-executing the steps of applying the second segmentation operation, extracting the in-focus object, and determining the similarity index; and
c) iterating steps a) and b) until the similarity index reaches a maximum achievable value.

10. The method of claim 9, further comprising:
recording a number of iterations performed; and
terminating the iterations if a maximum number of iterations is reached.

11. The method of claim 1, further comprising:
applying the second segmentation operation iteratively across different regions of the received image to identify multiple distinct in-focus objects;
extracting each of the identified distinct in-focus objects from both the first segmented image and the second segmented image, resulting in multiple sets of delineated images of the individual objects;
for each set of delineated images of an object, determining a similarity index based on the delineated images; and
in response to determining that the similarity index for a set is above a threshold, extracting a corresponding in-focus object from the received image.

12. A system comprising control circuitry configured to:
receive an image, the image having an associated depth of field setting due to a first segmentation operation applied to the image;
apply a second segmentation operation to the image, the second segmentation operation comprising adjusting the depth of field setting to a maximum to generate a first segmented image, and adjusting the depth of field setting to a minimum to generate a second segmented image;
extract an in-focus object from each of the first segmented image and the second segmented image, resulting in delineated images of the in-focus object;
determine a similarity index between the delineated images; and
in response to a determination that the similarity index is above a threshold, extract an in-focus object corresponding to the delineated images from the received image.

13. The system of claim 12, wherein the control circuitry is further configured to:
generate, in response to determining that the similarity index is below the threshold, the delineated images from the first and second segmented images for presentation at a user device;
receive a feedback input to select one of the delineated images from the first segmented image or the second segmented image; and
utilize the feedback input to train a machine learning model.

14. The system of claim 13, wherein the control circuitry is further configured to:
in response to determining that the similarity index is below the threshold, provide an interface to adjust a depth of field setting to generate a third segmented image.

15. The system of claim 14, wherein the control circuitry is further configured to:
adjust the depth of field setting of the in-focus object in real-time in response to a user input via the interface to generate the third segmented image having a depth of field setting between the maximum and the minimum depth of field settings.

16. The system of claim 12, wherein the control circuitry, when determining the similarity index, is further configured to:
convert the delineated images from the first and second segmented images into corresponding grayscale pixel maps; and
compare the grayscale pixel maps.

17. The system of claim 12, wherein the control circuitry is further configured to:
determine a capturing device of the image;
retrieve information relating to the capturing device from a database; and
optimize the second segmentation operation based on the retrieved information.

18. The system of claim 12, wherein the control circuitry is further configured to:
apply the second segmentation operation to the image at multiple intermediate depth of field settings between the maximum depth of field setting and the minimum depth of field setting;

extract in-focus objects from the segmented images obtained from each of the intermediate depth of field settings, resulting in multiple further delineated images of the in-focus object; and determine an average similarity index between the multiple delineated images.

19. The system of claim 12, wherein the control circuitry is further configured to:
   a) in response to determining the similarity index is below the threshold, apply additional image enhancement techniques to the received image;
   b) re-execute the steps of applying the second segmentation operation, extracting the in-focus object, and determining the similarity index; and
   c) iterate steps a) and b) until the similarity index reaches a maximum achievable value.

20. The system of claim 19, wherein the control circuitry is further configured to:
   record a number of iterations performed; and
   terminate the iterations if a maximum number of iterations is reached.

* * * * *